US009685021B2

(12) United States Patent
Auger

(10) Patent No.: US 9,685,021 B2
(45) Date of Patent: Jun. 20, 2017

(54) POINT-OF-SALE-SCANNER

(71) Applicant: Raymond W. Auger, North Scituate, RI (US)

(72) Inventor: Raymond W. Auger, North Scituate, RI (US)

(73) Assignee: CVS PHARMACY, INC., Woonsocket, RI (US)

( * ) Notice: Subject to any disclaimer, the term of this patent is extended or adjusted under 35 U.S.C. 154(b) by 0 days.

(21) Appl. No.: 15/045,090

(22) Filed: Feb. 16, 2016

(65) Prior Publication Data

US 2016/0163142 A1    Jun. 9, 2016

Related U.S. Application Data

(63) Continuation-in-part of application No. 14/988,148, filed on Jan. 5, 2016, now Pat. No. 9,582,700, which
(Continued)

(51) Int. Cl.
| G06K 7/10 | (2006.01) |
| G07D 7/20 | (2016.01) |
| G06K 19/06 | (2006.01) |
| G07D 7/00 | (2016.01) |
| G06K 7/14 | (2006.01) |
| G07D 7/12 | (2016.01) |
| G07D 7/2033 | (2016.01) |
(Continued)

(52) U.S. Cl.
CPC ........... *G07D 7/20* (2013.01); *G06K 7/10564* (2013.01); *G06K 7/10881* (2013.01); *G06K 7/1447* (2013.01); *G06K 19/0614* (2013.01); *G07D 7/0026* (2013.01); *G07D 7/12* (2013.01); *G07D 7/2033* (2013.01); *G07F 7/086* (2013.01); *G07G 1/0081* (2013.01); *H04N 1/00005* (2013.01); *H04N 1/02815* (2013.01); *H04N 2201/0081* (2013.01); *H04N 2201/0096* (2013.01)

(58) Field of Classification Search
CPC .. G06K 19/0614; G06K 7/10564; G06K 7/12; G06K 19/10; G07D 7/12; G07D 11/0066; G07D 7/00; G07D 7/128; B42D 25/29
USPC ............................................. 235/383, 462.24
See application file for complete search history.

(56) References Cited

U.S. PATENT DOCUMENTS

| 4,359,633 | A | * | 11/1982 | Bianco | ................... | G06K 19/14 |
| | | | | | | 235/462.06 |
| 5,296,949 | A | | 3/1994 | Pennace | | |

(Continued)

FOREIGN PATENT DOCUMENTS

| CN | 202093594 | 12/2011 |
| DE | 102004045708 | 3/2006 |
| WO | 0004516 | 1/2000 |

OTHER PUBLICATIONS

United States Office Action dated Jun. 17, 2016 for corresponding U.S. Appl. No. 14/988,148.

*Primary Examiner* — Claude J Brown

(57) ABSTRACT

Verifying the authenticity of a bill of currency includes configuring an ultraviolet filter mounted within a point-of-sale scanner to allow the passage of ultraviolet light within, illuminating the bill of currency with ultraviolet light, capturing, with the point-of-sale scanner, an image of the bill of currency, and determining if the bill of currency is authentic by analyzing the image.

20 Claims, 3 Drawing Sheets

Related U.S. Application Data is a continuation of application No. 14/520,598, filed on Oct. 22, 2014, now Pat. No. 9,235,836.

(60) Provisional application No. 61/894,111, filed on Oct. 22, 2013.

(51) Int. Cl.
*G07F 7/08* (2006.01)
*H04N 1/00* (2006.01)
*H04N 1/028* (2006.01)
*G07G 1/00* (2006.01)

(56) References Cited

U.S. PATENT DOCUMENTS

| | | | |
|---|---|---|---|
| 5,331,140 A | 7/1994 | Stephany | |
| 5,640,463 A | 6/1997 | Csulits | |
| 5,856,048 A * | 1/1999 | Tahara | B41M 3/14 283/85 |
| 5,867,586 A | 2/1999 | Liang | |
| 6,165,937 A * | 12/2000 | Puckett | B41M 5/42 503/201 |
| 8,944,234 B1 * | 2/2015 | Csulits | G07D 7/004 194/206 |
| 2001/0048027 A1 * | 12/2001 | Walsh | A61N 5/1048 235/385 |
| 2002/0030112 A1 * | 3/2002 | Schreiber | G06K 7/12 235/494 |
| 2003/0016290 A1 * | 1/2003 | Kwon | H04N 5/2256 348/216.1 |
| 2005/0148890 A1 * | 7/2005 | Hastings | A61B 5/0006 600/509 |
| 2007/0057764 A1 | 3/2007 | Sato | |
| 2008/0106726 A1 * | 5/2008 | Park | G07D 7/0026 356/71 |
| 2009/0294244 A1 * | 12/2009 | Charych | G07D 11/0066 194/206 |
| 2010/0315693 A1 | 12/2010 | Lam | |
| 2011/0063430 A1 | 3/2011 | Hyun | |
| 2012/0075442 A1 | 3/2012 | Vujic | |
| 2013/0070090 A1 * | 3/2013 | Bufalini | G06F 19/3462 348/143 |
| 2013/0234043 A1 * | 9/2013 | Hussain | G01N 21/64 250/459.1 |

* cited by examiner

POINT-OF-SALE-SCANNER

CROSS-REFERENCE TO RELATED APPLICATIONS

This application is a continuation-in-part of and claims priority to U.S. patent application Ser. No. 14/988,148, filed Jan. 5, 2016, which a continuation of and claims priority to U.S. patent application Ser. No. 14/520,598, filed Oct. 22, 2014, now U.S. Pat. No. 9,235,836, which claims priority to U.S. Provisional Patent Application No. 61/894,111, filed Oct. 22, 2013, the disclosures of which are hereby incorporated by reference herein in their entirety.

TECHNICAL FIELD

Embodiments of the present invention relate generally to point-of-sale terminals and, more particularly, to point-of-sale scanners used with said terminals.

BACKGROUND

A cashier, clerk, or other operator of a point-of-sale ("POS") may need to verify the age and/or identity of a customer who is attempting to purchase an item for which such verification is required and/or may need to verify the authenticity of bills of currency (e.g., U.S. dollar bills, British pound notes, or any other type of bill of currency) offered in payment for the item. The items for purchase may include alcohol, tobacco or tobacco products, pharmaceuticals containing pseudoephedrine or other drugs; and other regulated goods and services. The verification may be required by a local, state, or federal government or agency and/or by store or company policy.

One way to effect such verification is by inspection of a driver's license, voter ID card, or other form of identification belonging to the customer to confirm the customer's identity and age. In addition, a hologram or other similar element embedded into the identification card may be inspected to determine the authenticity of the identification card. Existing systems bathe the identification card in ultraviolet ("UV") light, thereby stimulating the hologram to fluoresce light in the visible spectrum. A camera or similar photosensor captures an image of the stimulated hologram, analyzes the image, and determines whether the identification card is authentic.

Existing UV scanners may present several disadvantages and deficiencies that make their integration with existing POS systems impossible, inconvenient, and/or cost-prohibitive, especially for POS systems that need only verify identification cards infrequently. Such UV scanners may be hardware-incompatible with conventional POS systems, for example, and/or their driver, interface, or operating software may be incompatible with the POS software. Furthermore, a UV scanner represents yet another device that the POS operator must be trained on, manage, and store when not in use. A need therefore exists for UV scanners that are more compatible with POS systems.

SUMMARY

In one aspect, a method for using a point-of-sale scanner includes capturing, with the point-of-sale scanner, an infrared image of a bar code associated with an item for sale while the passage of ultraviolet light is blocked; determining if the item for sale is associated with use of a counterfeit bill of currency offered as payment for the item for sale; configuring an ultraviolet filter mounted within a point-of-scale scanner to allow the passage of ultraviolet light within; illuminating the bill of currency with ultraviolet light emitted from the point-of-sale scanner; capturing, with the point-of-sale scanner while the passage of ultraviolet light is allowed, an image of the bill of currency that includes a presence or absence of a fluorescent response to the ultraviolet light; and determining if the bill of currency is authentic based on the presence or absence of the fluorescent response.

The ultraviolet filter may be re-configured to block the passage of ultraviolet light. The item for sale may be an alcohol product, a tobacco product, or a drug product. The step of determining if the item for sale may be associated with use of the counterfeit bill of currency is performed on the point-of-scale scanner, at a point-of-sale computer, or on a remote server. A full-spectrum image of the bill of currency may be captured with the point-of-sale scanner while the passage of ultraviolet light is blocked. A type of the bill of currency may be determined based on the full-spectrum image. Audio or haptic feedback may be provided upon determining that the bill of currency is authentic. If the bill of currency is authentic may be determined if the bill of currency has a denomination greater than a minimum value and/or disposed in a store having a history of counterfeiting.

In another aspect, a system for verifying the authenticity of a bill of currency includes a light source for providing infrared and ultraviolet light; an image sensor for capturing image data;

a filter for filtering ultraviolet light; a filter controller for configuring the filter such that, in a first mode, the filter blocks ultraviolet light from striking the sensor and, in a second mode, permits ultraviolet light to strike the sensor; and a processor for controlling the light source, image sensor, and filter controller such that the point-of-sale scanner captures an image of a bar code associated with an item for sale while the light source illuminates the bar code with infrared light and while the filter filters ultraviolet light from the light source and, if the item for sale associated with the bar code is associated with use of a counterfeit bill of currency offered as payment for the item for sale, an image of a bill of currency offered as payment for the item for sale while the bill of currency is being illuminated by ultraviolet light from the light source.

The processor may be further configured for controlling the light source, image sensor, and filter controller such that the point-of-sale scanner captures a second image of the bill of currency while the bill of currency is being illuminated by ambient light. A point-of-scale computer may be in communication with the point-of-scale scanner, a computer display may be in communication with the point-of-scale computer. The point-of-scale scanner may further include a speaker for providing audio feedback, a vibrating element for providing haptic feedback, and/or a computer memory for storing the image data. The filter controller may include a mechanism for moving the filter and/or an electrical circuit for changing an electrical property of the filter. The light source may include a first LED for providing infrared light, a second LED for providing ultraviolet light, and/or an LED for providing both infrared and ultraviolet light.

These and other objects, along with advantages and features of the present invention herein disclosed, will become more apparent through reference to the following description, the accompanying drawings, and the claims.

Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Described herein are various embodiments of methods and systems for verifying the authenticity of an identification card at a POS terminal and/or verifying the authenticity of bills of currency such as U.S. dollar bills, British pound notes, or any other type of bill of currency (referred to hereafter as "bills of currency" or "bills"). In various embodiments, an infrared ("IR") scanner used for scanning universal product codes ("UPCs") includes a source of UV light; the scanner may also be used to capture an image of an identification card and/or bill of currency while it is exposed to said UV illumination. The captured image may then be analyzed to determine the authenticity of the identification card and/or bill of currency.

Figure 1:
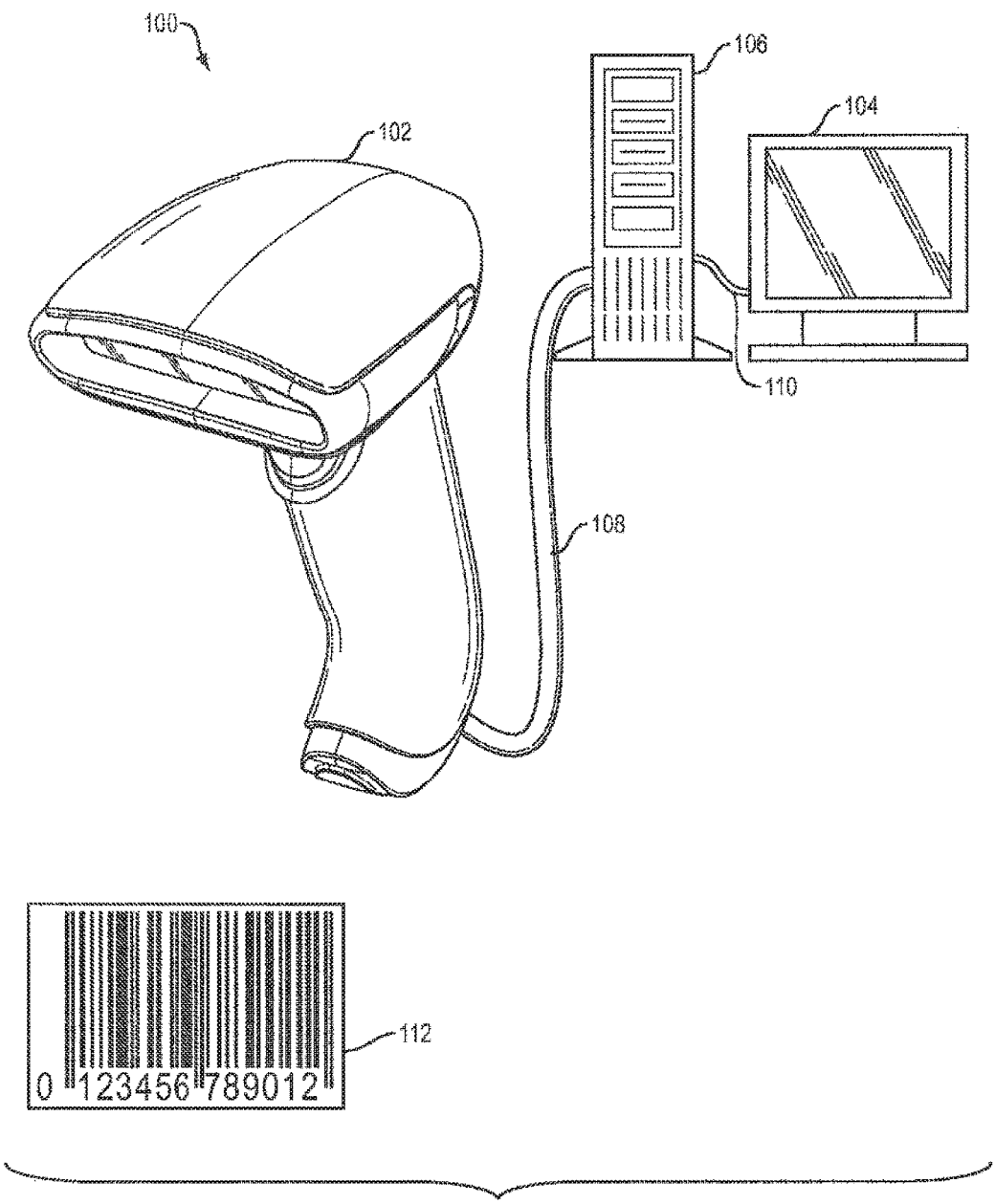
FIG. 1 illustrates a point-of-sale system in accordance with an embodiment of the present invention.

FIG. 1 illustrates a POS system 100 that includes a handheld scanner 102, a display 104, and a computer 106. The scanner 102 communicates with the computer 106 via a first wired link 108, and the computer 106 communicates with the display 104 via a second wired link 110. In other embodiments, either or both of the wired links 108, 110 are wireless links (using, e.g., a Wi-Fi or BLUETOOTH connection). The scanner 102 and/or computer 106 may further communicate with a remote computer, such as a server computer, using a wide-area network such as the Internet or a local-area network.

The POS system 100 may be used to identify one or more items that a customer wishes to purchase by directing the scanner 102 toward a UPC (such as the UPC 112) attached to or associated with the item(s); other identification markings, such as numbers, symbols, or 2D barcodes may be used instead of or in addition to the UPC. The scanner 102 emits IR light toward the UPC 112 and captures a reflection of said light, thereby scanning and reading the numbers encoded in the UPC 112 via any means known in the art. The POS system 100 may provide such features as displaying information about the scanned items on the display 104; the scanning of coupons, rewards, or discount cards; accepting payment via cash, credit, or checks; the retrieval of customer information from a remote server; and/or any other such features as are typically provided by POS systems. The scanner 102 may contain hardware and/or software for the performance of some or all of the above-identified features; in other embodiments, the scanner 102 transmits raw data (e.g., image data) to the computer 106 for analysis thereon.

The POS system 100 is exemplary only and not intended to be limiting; any POS system known in the art is within the scope of the present invention.

Figure 2:
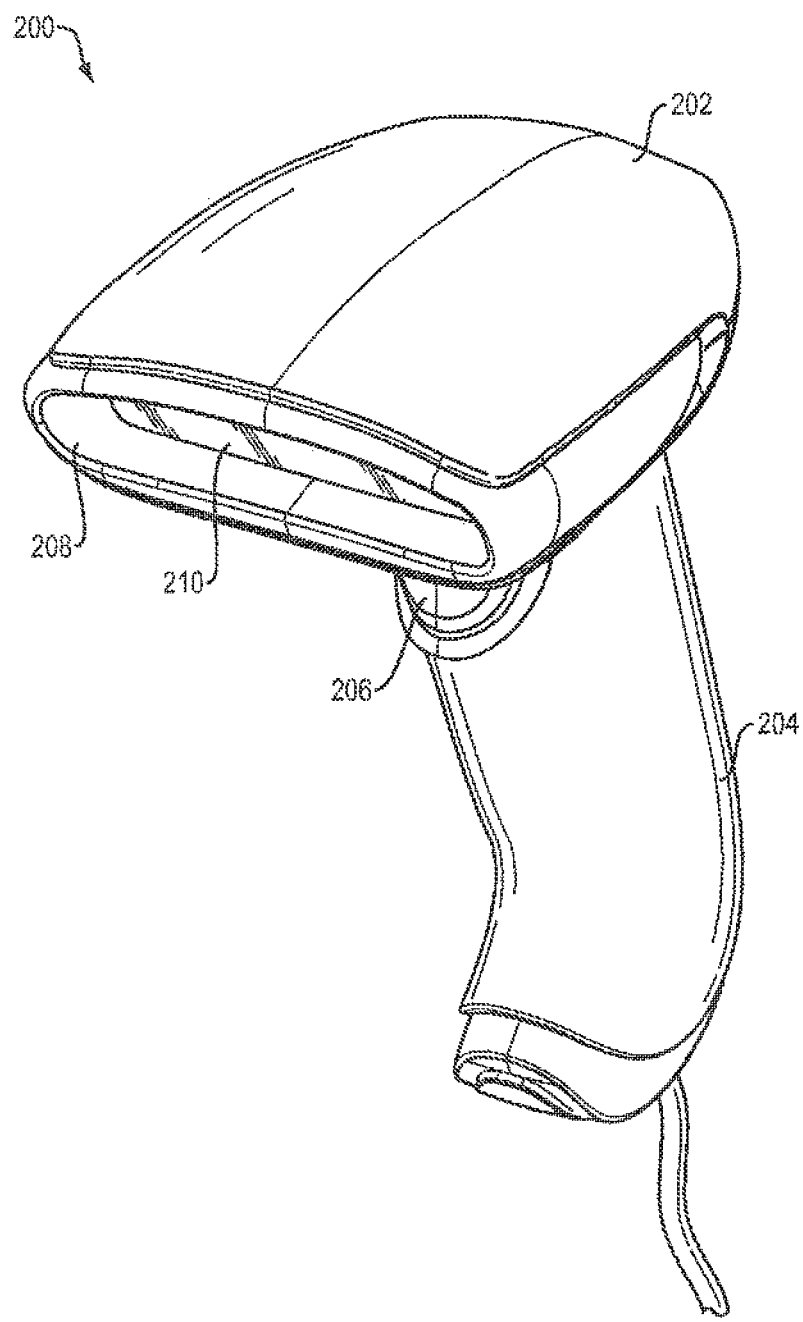
FIG. 2 illustrates a point-of-sale scanner in accordance with an embodiment of the present invention.

One embodiment of a scanner 200 is illustrated in FIG. 2. The scanner 200 includes a main housing 202, a handgrip 204, a trigger switch 206, and a front face 208. The front face 208 includes a transparent or translucent window 210. The window 210 allows IR, UV, and/or other light or energy to pass therethrough. A user may activate the trigger 206 to initiate a scan of an UPC associated with an item for purchase.

In some embodiments, an item that a customer wishes to purchase requires verification of the customer's age or identity. Such items may include alcohol or tobacco products, which may require that the customer be a certain minimum age (e.g., 18 or 21 years old) as defined by local, state, or federal law or regulation and/or the corporate policy of the corporation or other entity selling the product. Other items, such as pseudoephedrine, may require identification of the customer (e.g., name and address) for purposes of tracking sales of the items and thereby limiting sales to a certain maximum number of units to a given customer.

If a customer attempts to purchase one or more of these restricted items, the scanner 200 may identify the items as restricted upon the scanning of a UPC code associated with the item(s). The scanner 200 may transmit the UPC code to a local or remote computer, which may compare the UPC code to a database of UPC codes to determine if the item is restricted. As described in greater detail below, the scanner 200 (and/or the POS system 100 of FIG. 1) may prompt the operator of the POS system 100 to scan an identification card (such as a driver's license) belonging to the customer; the scanner 200 may then emit UV light to thereby illuminate the identification card, scan an image of the UV-illuminated card, and thereafter determine if the identification card is authentic.

Figure 3:
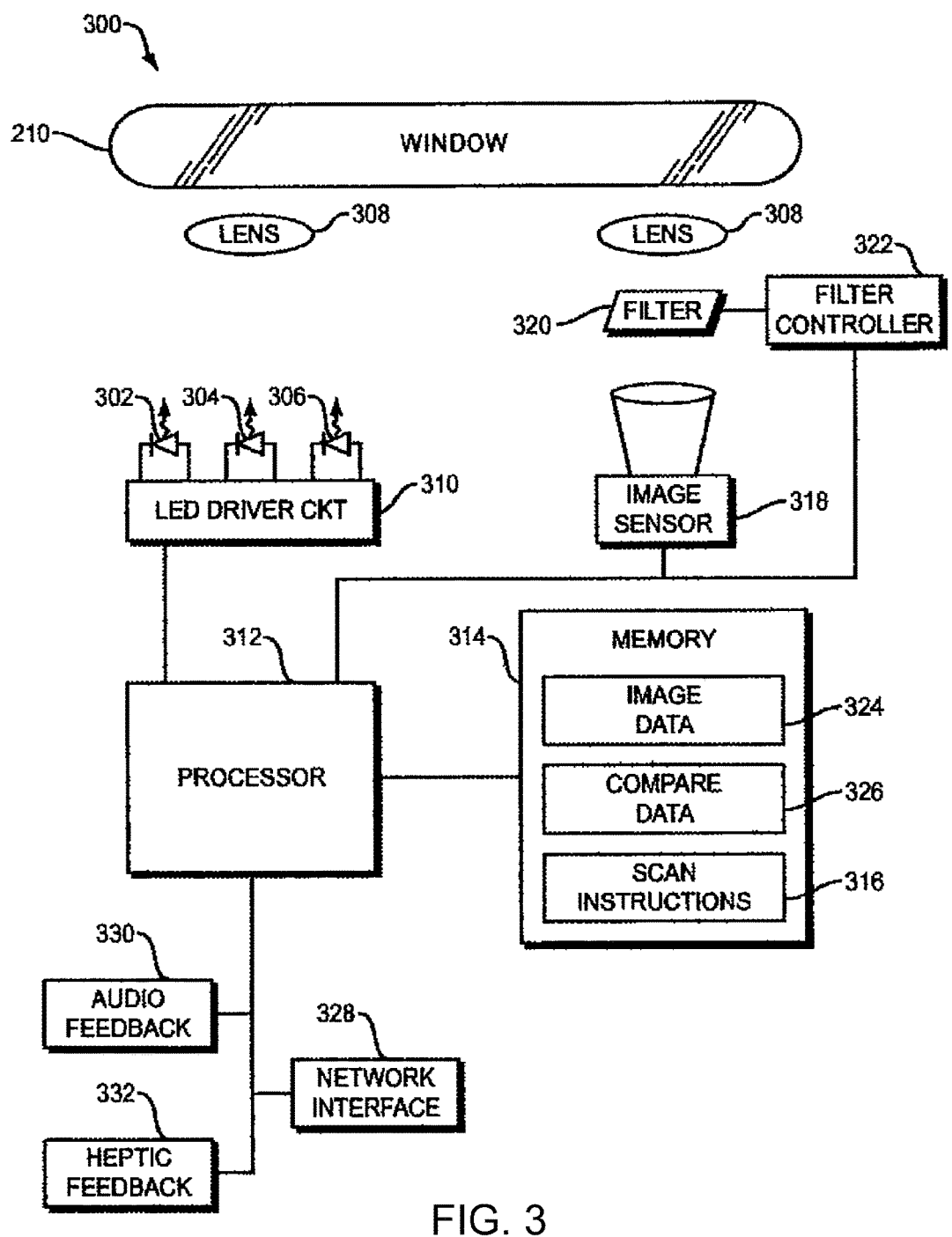
FIG. 3 illustrates a block diagram of a point-of-sale scanner system in accordance with an embodiment of the present invention.

A block diagram 300 of the relevant internal system components of the scanner 200 appears in FIG. 3. One or more light-emitting diodes ("LEDs") 302, 304, 306 may be used to generate light for transmission outward (from the point of view of the scanner 200) from the window 210. A first LED 302 may generate IR-wavelength light for use in scanning UPCs, and a second LED 304 may be used to generate UV-wavelength light (for use in illuminating an identification card with UV light). In some embodiments, a third LED 306 is used to generate visible-spectrum light (for use as, e.g., a camera flash) to aid in the capture of visible-spectrum images; if natural ambient light is sufficient, however, the third LED 306 may not be included or may be selectively enabled. The LEDs 302, 304, 306 are illustrative only and not intended to be limiting; in other embodiments, multiple LEDs may be used for each singly-depicted LED 302, 304, 306 (configured as, for example, an LED string), and a single LED 302, 304, 306 may be used to generate different types of light. For example, the first LED 302 may be used to generate both IR-wavelength light and UV-wavelength light.

A lens 308 may be used to focus or otherwise direct light from one or more of the LEDs 302, 304, 306. In other embodiments, separate lenses 308 may be used for one or more of the LEDs 302, 304, 306. The lens 308 may focus IR-wavelength light from the first LED 302 into one or more narrow beams, for example, for use in scanning an UPC; the lens 308 may also or instead diffuse light from the second 304 or third 306 LEDs. In still other embodiments, no lens 308 is used with one or more of the LEDs 302, 304, 306.

An LED driver circuit 310 may be used to supply voltage and/or current to the LEDs 302, 304, 306 and may include, for example, a voltage or current regulator. The LED driver circuit 310 may be designed to drive the LEDs 302, 304, 306 in accordance with their design parameters, power requirements, and tolerances.

A processor 312 may be used to control the LED driver circuit 310. The processor 312 may be a microprocessor, microcontroller, FPGA, ASIC, or any other type of digital, analog, or mixed-signal control circuit. Instructions and data for use with the processor 312 may be stored in a memory 314. For example, the memory 314 may include instructions 316 for scanning a UPC and/or identification card; the instructions 316 may be written in, for example, C, C++, Python, assembly code, a custom language, or any other computer language. The memory 314 may be RAM, ROM, firmware, flash memory, or any other kind of volatile or non-volatile storage medium.

The system 300 further includes an image sensor 318 for capturing light received through the window 210. The image sensor may be a charge-coupled device ("CCD") or any other type of suitable image sensor, and may have a resolution of 640×480, 1024×768, or any other suitable resolution. A lens 308 may be used to focus incoming light on the image sensor 318; the lens may be the same as the first lens 308 or may be a different lens.

In one embodiment, a filter 320 filters the incoming light from the window 210 before it strikes the image sensor 310. For example, the filter 320 may filter UV-wavelength light such that, during a scan of a UPC, the image sensor 310 does not receive UV-wavelength light. This filtering may improve the accuracy with which UPCs are scanned and read.

In one embodiment, a filter controller 322 configures the filter 320 such that it filters incident light at a first point in time and does not filter light at a second point in time. For example, the processor 312 may instruct the filter 320 to filter UV light during the IR-wavelength scan of a UPC and instruct the filter 320 to not filter UV light during the scan of an identification card. The filter controller 322 may be a mechanical mechanism, such as a servo motor, that moves or rotates the filter 320. For example, the filter controller 322 may rotate the filter 320 by 90 degrees such that it allows light from the window 210 to pass through. The filter controller 322 may, in other embodiments, move the filter 320 laterally (e.g., perpendicularly with respect to the image sensor 318) to allow unfiltered light to strike the image sensor 318. In still other embodiments, the filter controller 322 is an electrical circuit that changes the properties of the filter 320 via the application of electrical signals to thereby allow for selective filtering of light incoming from the window 210. For example, the filter 320 may include a MEMS, LCD, LED, and/or piezoelectric layer that filters light when an electrical signal is applied via the filter controller 322 and does not filter light when the electrical signal is not applied (or vice versa).

Image data 324 from the image sensor 318 may be stored in the memory 314. The image data 324 may include raw data from the sensor 318 and/or any of a variety of image formats, such as JPEG, BMP, or TIFF. The memory 314 may further include comparison data 326. In one embodiment, a first image is taken of an identification card while it is under UV illumination (as provided by, for example, the second LED 304), and a second image is taken of the identification card while it is under illumination from natural or "white" light (as provided by ambient light and/or the third LED 306). The two images may be taken in either order. The processor 212 may then compare the first and second images to detect differences therebetween; the differences may be then compared against a library of images stored in the compare data 326 for a match. If a match is found, the identification card is deemed authentic. In another embodiment, only one image is taken of the identification card (while the identification card is illuminated with UV light); the processor 312 may then analyze the image to determine which portions luminesce in response to the UV light and which portions do not (by, for example, determining which pixels of the image fall within a color or luminosity range corresponding to UV excitation) and compare the detected portions to the library in the compare data 326. In another embodiment, if the processor 312 detects that no UV-luminescent regions are present in the identification card, the card it automatically deemed inauthentic.

The system 300 may include a network interface 328 for communication with other electronic devices or systems (such as the computer 100 depicted in FIG. 1). The network interface 328 may include hardware, software, and/or firmware for implementing Wi-Fi, ETHERNET, or any other networking protocol. Some or all of the functions described above may thus be performed remotely on the computer 100, a remote server, or any other system. For example, the processor 312 may transmit image data captured by the image sensor 318 and the image comparison and library look-up may be performed remotely.

In one embodiment, the system 300 includes an audio feedback element 330 (such as a speaker) and/or a haptic feedback element 332 (such as a buzzer or other vibrating element). The feedback elements 330, 332 may be used to signal to an operator of the scanner 200 that verification of an identification card, bill of currency, or other item is required. For example, if the operator scans the UPC of an item requiring verification, the scanner 200 may provide audio and/or tactile feedback to so inform the operator. Further feedback may be used to inform the operator of the successful scanning of the identification card and/or bill of currency with and/or without UV illumination and/or of the successful (or unsuccessful) validation of the identification card and/or bill of currency.

In one embodiment, in addition to identification-card validation, the processor 312 scans the text, photo, or other information on the identification card to determine the age and/or identity of the owner of the card. For example, the processor 312 may analyze the image data 324 corresponding to the identification card for the keywords "Date of Birth," "D.O.B.," or similar using image pattern matching, optical-character recognition, or similar techniques. When found, the processor 312 may search in the image for numbers corresponding to the owner's date of birth, detect those numbers, and determine the age of the owner. Optionally, the system 300 may communicate with another system or device (via the network interface 328) to determine if the age of the owner is sufficient to purchase the associated item. Similarly, the processor 312 may determine the name, address, driver's license number, social-security number, or other identifying information associated with the owner by scanning the image data 324 and communicate with another system to determine if the owner of the identification card is permitted to purchase a controlled item (such as pseudoephedrine) associated with a scanned UPC. The system 300 may provide audio and/or haptic feedback to the operator of the scanner 300 accordingly. As described above, some or all of these functions may be performed remotely (on, for example, the computer 100).

In various embodiments of the present invention, the scanner 300 is instead or in addition used to determine the authenticity of bills of currency offered as payment for one or more items for sale. The scanner 300 may be configured to emit UV light as described above and thereafter capture an image of the bill of currency. An authentic, non-counterfeit bill may include one or more fluorescent markers, labels, watermarks, or similar items on its surface and/or embedded within it. In response to the emitted UV light, the markers may fluoresce. The image sensor 318 in the scanner 300 may be used to capture an image of the bill of currency that includes its fluorescent response, if any. The scanner 300, POS terminal, and/or remote computer may thereafter analyze the captured image to determine if the bill of currency is authentic based on the presence or absence of the fluorescent response.

In some embodiments, the captured image is analyzed to determine merely if a fluorescent response is present; if a response is present, the bill of currency is deemed authentic, and if a response is not present, the bill of currency is deemed inauthentic. Presence of the fluorescent response may be determined by analyzing the colors in the captured image and searching for regions of color that match the fluorescent response. In other embodiments, the size, shape, position, wavelength, or other factor of the fluorescent response is analyzed instead of or in addition to the presence of the fluorescent response. One or more of these other factors may be compared to known factors stored in a database (connected to, for example, the POS terminal and/or remote computer); if the factor matches an expected value, the bill of currency is deemed authentic. For example, if a bill of currency is expected to have a fluorescent marker in its upper-right corner, the given bill of currency is deemed authentic if a fluorescent marker is detected in the upper-right corner of the bill of currency in the captured image. In some embodiments, the authenticity of the bill of currency is determined instead or in addition to detecting the fluorescent marker by, for example, detecting a watermark, seal, embedded stripe, or similar feature.

Different bills of currency may have different types of expected fluorescent responses; in these embodiments, the type of the bill of currency in the captured image is determined by analyzing some or all of features present on the bill of currency appearing in the captured image. For example, the captured image may be analyzed with an optical-character recognition algorithm to detect characters thereon, and the type of bill of currency may be determined from the detected characters. A U.S. twenty-dollar bill of currency, for example, includes the digits "20" and the letters "TWENTY DOLLARS" on its front face; these characters may be extracted and, if detected, the bill of currency may be identified as the U.S. twenty-dollar bill. Other types or categories of bills of currency may be determined by similar analysis of characters thereon, as well as the color, size, and/or shape of the bill or any logos, seals, or other emblems printed thereon.

In some embodiments, a second image of the bill of currency is captured in which the bill of currency is illuminated by only ambient light (provided by, e.g., natural or artificial lighting sources such as the sun or light bulbs) and/or a broad-spectrum light source such as a camera flash (provided by, e.g., one of the LEDs 302, 304, 306). This second image may be analyzed in lieu of or in addition to analyzing the UV-lit image described above to determine the type or category of the bill of currency. The second image may be captured before or after the UV-lit image is captured. In some embodiments, the second image is captured only if the bill type or category cannot be determined from the UV-lit image.

Certain items for sale may be associated with a higher risk that counterfeit bills may be presented in exchange for them. These items may include, for example, tobacco products, alcohol products, certain pharmaceutical products, high-price products, or any other category of products. The type of product may be determined from the scanned UPC; an image of the UPC and/or data associated therewith (e.g., the number encoded in the UPC) may be compared to a list or database of known UPCs and/or associated numbers to determine the product type. If the product type includes one of the products associated with a higher risk of counterfeiting, the scanner 300, POS system, and/or other system may inform the operator that any bills of currency presented in exchange for the product must be scanned, as described above, while lit with UV light.

In other embodiments, other events or factors may trigger the requirement that the operator scan any offered bills of sale with UV light. For example, if a bill greater than a certain denomination (e.g., twenty U.S. dollars) is offered; if the store associated with the POS system is located in an area in which counterfeiting is known to occur; if certain combinations of products are presented for purchase by the same person or group of people; or for other similar factors.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for using a point-of-sale scanner, the method comprising:
    capturing, with the point-of-sale scanner, an infrared image of a bar code associated with an item for sale while the passage of ultraviolet light is blocked;
    determining if the item for sale is associated with use of a counterfeit bill of currency offered as payment for the item for sale;
    configuring an ultraviolet filter mounted within a point-of-sale scanner to allow the passage of ultraviolet light within;

illuminating the bill of currency with ultraviolet light emitted from the point-of-sale scanner;

capturing, with the point-of-sale scanner while the passage of ultraviolet light is allowed, an image of the bill of currency that includes a fluorescent response to the ultraviolet light;

comparing a size, a shape, a position, and a wavelength of the fluorescent response to known factors for the bill of currency stored in a database on a remote computer; and determining if the bill of currency is authentic based on a presence or absence of the fluorescent response and the comparison of the size, the shape, the position, and the wavelength of the fluorescent response to the known factors for the bill of currency stored in the database on the remote computer.

2. The method of claim 1, further comprising re-configuring the ultraviolet filter to block the passage of ultraviolet light.

3. The method of claim 1, wherein the item for sale comprises an alcohol product, a tobacco product, or a drug product.

4. The method of claim 1, wherein the step of determining if the item for sale is associated with use of the counterfeit bill of currency is performed on the point-of-sale scanner, at a point-of-sale computer, or on a remote server.

5. The method of claim 1, further comprising capturing, with the point-of-sale scanner while the passage of ultraviolet light is blocked, a full-spectrum visible light image of the bill of currency.

6. The method of claim 5, further comprising determining a type of the bill of currency based on the full-spectrum visible light image.

7. The method of claim 1, further comprising providing audio or haptic feedback upon determining that the bill of currency is authentic.

8. The method of claim 1, further comprising determining if the bill of currency is authentic if the bill of currency has a denomination greater than a minimum value.

9. The method of claim 1, further comprising determining if the bill of currency is authentic if the point-of-sale scanner is disposed in a store having a history of counterfeiting.

10. A system for verifying the authenticity of a bill of currency, the system comprising:

a light source for providing infrared and ultraviolet light;
an image sensor for capturing image data;
a filter for filtering ultraviolet light;
a filter controller for configuring the filter such that, in a first mode, the filter blocks ultraviolet light from striking the sensor and, in a second mode, permits ultraviolet light to strike the sensor; and
a processor for controlling the light source, image sensor, and filter controller such that a point-of-sale scanner captures an image of a bar code associated with an item for sale while the light source illuminates the bar code with infrared light and while the filter filters ultraviolet light from the light source and, if the item for sale associated with the bar code is associated with use of a counterfeit bill of currency offered as payment for the item for sale, captures an image of a bill of currency offered as payment for the item for sale while the bill of currency is being illuminated by ultraviolet light from the light source, wherein the captured image of the bill of currency includes a fluorescent response to the ultraviolet light, wherein a size, a shape, a position, and a wavelength of the fluorescent response is compared to known factors for the bill of currency stored in a database on a remote computer; and wherein the bill of currency is determined to be authentic based on a presence or absence of the fluorescent response and the comparison of the size, the shape, the position, and the wavelength of the fluorescent response to the known factors for the bill of currency stored in the database on the remote computer.

11. The system of claim 10, wherein the processor is further configured for controlling the light source, image sensor, and filter controller such that the point-of-sale scanner captures a second image of the bill of currency while the bill of currency is being illuminated by ambient light.

12. The system of claim 10, further comprising a point-of-sale computer in communication with the point-of-sale scanner.

13. The system of claim 12, further comprising a computer display in communication with the point-of-sale computer.

14. The system of claim 10, wherein the point-of-sale scanner further comprises a speaker for providing audio feedback.

15. The system of claim 10, wherein the point-of-sale scanner further comprises a vibrating element for providing haptic feedback.

16. The system of claim 10, wherein the point-of-sale scanner further comprises a computer memory for storing the image data.

17. The system of claim 10, wherein filter controller comprises a mechanism for moving the filter.

18. The system of claim 10, wherein filter controller comprises an electrical circuit for changing an electrical property of the filter.

19. The system of claim 10, wherein the light source comprises a first LED for providing infrared light and a second LED for providing ultraviolet light.

20. The system of claim 10, wherein the light source comprises an LED for providing both infrared and ultraviolet light.

* * * * *